US 9,379,538 B2

(12) United States Patent
Dai et al.

(10) Patent No.: US 9,379,538 B2
(45) Date of Patent: Jun. 28, 2016

(54) OUTPUT OVER-VOLTAGE PROTECTION CIRCUIT FOR POWER FACTOR CORRECTION

(71) Applicant: CSMC TECHNOLOGIES FAB2 CO., LTD., Jiangsu (CN)

(72) Inventors: Guoding Dai, Jiangsu (CN); Xiaohui Ma, Jiangsu (CN); ChaoYao Xue, Jiangsu (CN); Jian Ou, Jiangsu (CN); Jing Lu, Jiangsu (CN)

(73) Assignee: CSMC TECHNOLOGIES FAB2 CO., LTD., Jiangsu (CN)

( * ) Notice: Subject to any disclaimer, the term of this patent is extended or adjusted under 35 U.S.C. 154(b) by 142 days.

(21) Appl. No.: 14/357,724

(22) PCT Filed: Nov. 9, 2012

(86) PCT No.: PCT/CN2012/084359
§ 371 (c)(1),
(2) Date: May 12, 2014

(87) PCT Pub. No.: WO2013/067957
PCT Pub. Date: May 16, 2013

(65) Prior Publication Data
US 2014/0268464 A1 Sep. 18, 2014

(30) Foreign Application Priority Data

Nov. 11, 2011 (CN) .......................... 2011 1 0358789

(51) Int. Cl.
H02H 9/04 (2006.01)
H02M 1/32 (2007.01)
H02M 1/42 (2007.01)
H02H 7/125 (2006.01)

(52) U.S. Cl.
CPC ................. *H02H 9/04* (2013.01); *H02H 7/125* (2013.01); *H02M 1/32* (2013.01); *H02M 1/42* (2013.01); *Y02B 70/12* (2013.01)

(58) Field of Classification Search
CPC ........... H02H 7/125; H02H 9/04; H02M 1/32; H02M 1/42; Y02B 70/12

USPC ........................................................ 361/91.1
See application file for complete search history.

(56) References Cited

U.S. PATENT DOCUMENTS

| 5,691,889 A * | 11/1997 | Bazinet ................. H02M 3/156 323/222 |
| 2003/0201828 A1 * | 10/2003 | Yasukouchi .......... H03F 3/3067 330/257 |

(Continued)

FOREIGN PATENT DOCUMENTS

| CN | 201018409 Y | 2/2008 |
| CN | 101557162 A | 10/2009 |

(Continued)

*Primary Examiner* — Thienvu Tran
*Assistant Examiner* — Kevin J Comber
(74) *Attorney, Agent, or Firm* — Muncy, Geissler, Olds & Lowe, P.C.

(57) ABSTRACT

An output over-voltage protection circuit for power factor correction, which includes a chip external compensation network, a chip external resistor divider network, a static over-voltage detection circuit, a dynamic over-voltage detection circuit and a compare circuit; The chip external compensation network is connected between the chip external resistor divider network and the dynamic over-voltage detection circuit, the chip external compensation network converts the dynamic over-voltage signal conversion to the dynamic current signal and conveys it to the dynamic over-voltage detection circuit, the dynamic over-voltage detection circuit detects the dynamic current signal and ultimately produces the dynamic over-voltage signal (DYOVP); The dynamic over-voltage signal (DYOVP) is inputted into the compare circuit, which converts the dynamic over-voltage signal (DYOVP) into a voltage compared with a reference voltage and outputs a over-voltage control signal (OVP), so as to achieve a dynamic over-voltage protection function.

8 Claims, 3 Drawing Sheets

(56) References Cited

U.S. PATENT DOCUMENTS

2005/0024898 A1* 2/2005 Yang ............... H02M 3/33507
 363/21.12
2005/0270713 A1 12/2005 Pidutti et al.

FOREIGN PATENT DOCUMENTS

| | | |
|---|---|---|
| CN | 102035170 A | 4/2011 |
| CN | 102497093 A | 6/2012 |

\* cited by examiner

OUTPUT OVER-VOLTAGE PROTECTION CIRCUIT FOR POWER FACTOR CORRECTION

FIELD OF THE INVENTION

The present invention relates to a field of electronic circuit technology, which also relates to analog integrated circuits, and more particularly relates to an output over-voltage protection circuit for power factor correction, which is applied to the output over-voltage protection in the power factor correction controller.

BACKGROUND OF THE INVENTION

Switching mode power supply with alternating current input is a typical electronic system, which has a wide range of applications, and a number of the switching mode power supply applied in the application is great. Most of the input rectifier filter in the internal thereof consists of uncontrolled rectifier circuits and capacitor filter circuits composed of diodes. Due to this, the problems of harmonic pollution and lower power factor of the switching mode power supply are generated. In order to improve the efficiency of the switching mode power supply and reduce the grid pollution, the power factor correction technology is increasingly becoming a hot topic in the power supply design field.

In the switching mode power supply, any circuit that makes the input grid current be non-sinusoidal, or makes the sine wave and the sinusoidal input voltage be in different phases, or makes the input current have harmonic will reduce the power factor PF, thereby resulting in power loss. The use of the power factor correction controller (PFC) is one of the most effective methods to improve the power factor of electronic products and reduce harmonic interference. The broken line in FIG. 1 shows the output terminal voltage waveform of the bridge rectifier of the input terminal grid; the solid line shows the output terminal current waveform of the bridge rectifier of the input terminal grid. As shown in the figure, the outputted current waveform has a serious distortion, meanwhile, the power factor is much low. The waveforms shown in FIG. 2 are the input voltage waveform and the current waveform after using the power factor correction controller, the broken line therein shows the output terminal voltage waveform of the bridge rectifier of the input terminal grid; the solid line shows the output terminal current waveform of the bridge rectifier of the input terminal grid. The output current waveform strictly follows the input voltage waveform; the power factor is close to 1.

However, currently, there is no effective output over-voltage protection function or only a single static over-voltage protection in the power factor correction controller. For the power factor correction controller without output over-voltage protection function, the internal electronic components may be burned when the output voltage exceeds the rated value; for only a single static over-voltage protection in the power factor correction controller, when the load changes, the irreversible damage to the electronic components may be caused when the output voltage instantaneously rises over the rated value. Accordingly, when the output voltage of the power factor correction controller exceeds the rated value (static or dynamic), the protection circuit should provide an effective protection for the electronic components, which is the problems desiderate to be solved.

SUMMARY OF THE INVENTION

In order to overcome the disadvantages of the prior art, the present invention provides an output over-voltage protection circuit for power factor correction to effectively solve the above problems that there is no output over-voltage circuit or only a single static over-voltage circuit in the conventional power factor correction. The transient response capability of power factor correction for the output over-voltage circuit is enhanced. The present invention provides an effective protection for the power factor corrector and peripheral electronic devices by controlling the logic circuit to shutdown the power tube when an output over-voltage occurs.

The object of the present invention is obtained by the following technical solution:

The output over-voltage protection circuit for power factor correction includes an off-chip compensation network, an off-chip resistive divider network, a static over-voltage detection circuit, a dynamic over-voltage detection circuit, and a comparator circuit. The off-chip compensation network is coupled between the off-chip resistive divider network and the dynamic over-voltage detection circuit. The off-chip compensation network is configured to convert a dynamic over-voltage signal to a dynamic current signal and transmit the dynamic current signal to the dynamic over-voltage detection circuit. The dynamic over-voltage detection circuit is configured to detect the dynamic current signal and generate a dynamic over-voltage signal DYOVP. The dynamic over-voltage signal DYOVP is inputted into the comparator circuit. The comparator circuit is configured to convert the dynamic over-voltage signal DYOVP to a voltage and compare the voltage with a reference voltage and output an over-voltage control signal OVP so as to perform a dynamic over-voltage protection function.

The off-chip compensation network consists of a resistor R3, a capacitor C1, and a capacitor C2. An end of the capacitor C1 is used as an end of the off-chip compensation network and is connected to an end of the capacitor C2; the other end of the capacitor C1 is connected to the resistor R3; the other end of the capacitor C2 and the other end of the resistor R3 are connected together being as the other end of the off-chip compensation network and also an input terminal of the dynamic over-voltage detection circuit, the terminal is also an output terminal COMP of an error amplifier circuit.

The off-chip resistive divider network consists of a resistor R1 and a resistor R2. An end of the resistor R1 is connected to an output voltage $V_{OUT}$ of a power factor correction controller; the other end of the resistor R1 and an end of the R2 are connected together and are used as an input terminal of the off-chip compensation network and the static over-voltage detection circuit; the other end of the resistor R2 is connected to a ground GND.

The static over-voltage detection circuit includes a differential input stage circuit, an intermediate amplifier circuit, and a low clamp circuit. A non-inverting input end of the differential input stage circuit is connected to an output terminal of the off-chip resistive divider network; an inverting input end is connected to a reference voltage Vref1, the output terminal is connected to an input terminal of the intermediate amplifier circuit.

The intermediate amplifier circuit consists of a transistor Q4 and a capacitor C3. A base of the transistor Q4 and an end of the capacitor C3 are connected together and then connected to an input terminal of a differential input stage. A collector of the transistor Q4 and the other end of the capacitor C3 are connected together and then connected to an emitter of a low clamping switch Q3 being as an output terminal of the intermediate amplifier circuit. The intermediate amplifier is configured to perform a secondary amplification for an output signal of the differential input stage.

The low clamp circuit consists of a transistor Q1, a transistor Q2, a transistor Q3, and a current bias $I_{bias}$. An emitter of the transistor Q1 and an emitter of the transistor Q2 are connected to a volt current condenser VCC. A base and a collector of the transistor Q1 are connected together to be an end connected to a collector of the transistor Q3. A collector of the transistor Q2 is configured to output a static over-voltage signal STOVP to an input terminal of the comparator circuit. A base of the transistor Q3 is connected to a reference voltage Vref2; the Vref2 is a low clamping voltage of an output terminal COMP of an error amplifier. An emitter of the transistor Q3 is connected to an output terminal of an intermediate amplifier circuit. The current bias $I_{bias}$ provides a current needed to mirror output to STOVP when the low clamping circuit occurs.

The dynamic over-voltage detection circuit includes an AB push-pull output stage circuit and a dynamic current mirror circuit. An input terminal of the AB push-pull output stage circuit is connected to an output terminal of an intermediate amplifier circuit; the other end of the AB push-pull output stage circuit is connected to a bias circuit; the bias circuit is configured to provide a constant bias for the AB push-pull output stage circuit. An output terminal of the AB push-pull output stage circuit is connected to an input terminal of the dynamic current mirror circuit; the other output terminal is a COMP. The output terminal is connected to an output terminal of the off-chip compensation network, thus the COMP terminal is also an input terminal of the dynamic over-voltage detection circuit.

The AB push-pull output stage circuit consists of a transistor Q11, a transistor Q12, a transistor Q5, a transistor Q7, a transistor Q8, a transistor Q9, a resistor R4, a resistor R6, and a resistor R8. A base and a collector of the transistor Q11 are connected together and then connected to a base of the transistor Q12 and an end of the resistor R8; the other end of resistor R8 is connected to an emitter of the transistor Q12 and also connected to an output terminal of the intermediate amplifier circuit. An emitter of the transistor Q12 is connected to a base of the transistor Q8; an emitter of the transistor Q1 and a collector of the transistor Q12 are connected together to connect to a bias circuit, the emitter of the transistor Q11 is also connected to a base of the transistor Q7. An end of the resistor R4 is connected to the volt current condenser VCC; the other end of the resistor R4 is connected to an emitter of the transistor Q5. A base and a collector of the transistor Q5 are connected together to connect to a collector of the transistor Q5 and a base of the transistor Q6. An emitter of the transistor Q7 and an emitter of the transistor Q8 are connected together being as an output terminal VCOMP of the AB push-pull output stage circuit, and the end is also connected to the off-chip compensation network. The off-chip compensation network is configured to provide a dynamic current $I_{ST}$ to a COMP when the dynamic over-voltage occurs. A collector of the transistor Q8, a base and an emitter of the transistor Q9 are connected together; a base of the transistor Q9 and a base of the transistor Q10 are connected together, the emitter of the transistor Q9 is connected to an end of the resistor R6, the other end of the resistor R6 is connected to a ground GND.

The dynamic current mirror circuit consists of a resistor R5, a resistor R7, a transistor Q6, and a transistor Q10. An end of the resistor R5 is connected to a volt current condenser VCC, the other end of the resistor R5 is connected to an emitter of the transistor Q6. A base of the transistor Q6 and a base of the transistor Q5 are connected together to be an input terminal of a dynamic mirror circuit. An emitter of the transistor Q6 and an emitter of the transistor Q10 are connected together being as output terminal of the dynamic over-voltage signal and also being as an input terminal of the comparator circuit. A base of the transistor Q10 and a base of the transistor Q9 are connected together. An emitter of the transistor Q10 is connected to an end of the resistor R7, the other end of the resistor R7 is connected to a ground GNP.

Compared with the prior art, the present invention has the following advantages:

1. The present invention provides two over-voltage protection modes for the output voltage, which are static over-voltage protection and dynamic over-voltage protection, thus the problems that there is no effective output over-voltage protection or only a single static over-voltage protection in the conventional power factor correction controller is effectively solved.

2. The present invention implements a sampling of the dynamic over-voltage signal using the off-chip compensation network without additional electronic components. No cost increases while the system stability and reliability are improved.

3. Both over-voltage detection circuits provided by the present invention are integrated into the error amplifier circuit; this design simplifies the circuit and greatly reduces the actual layout area. Cost is saved and a much smaller chip is obtained while the system stability and reliability are improved.

DETAILED DESCRIPTION OF THE EMBODIMENTS

Reference will now be made to the drawings to describe, in detail, embodiments of the present invention.

Figure 1:
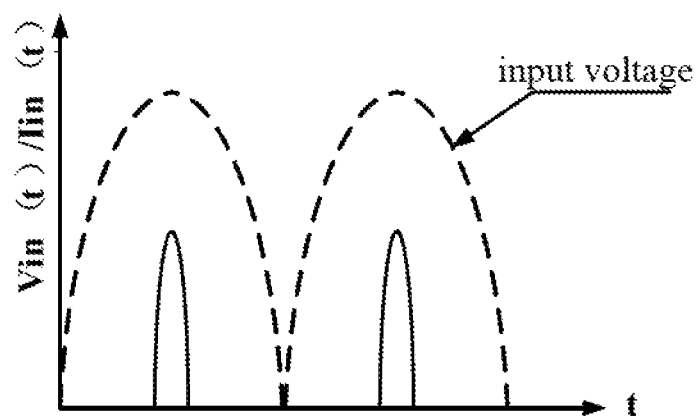
FIG. 1 is a graph showing the input voltage waveform and the input current waveform without using a power factor correction.
Figure 2:
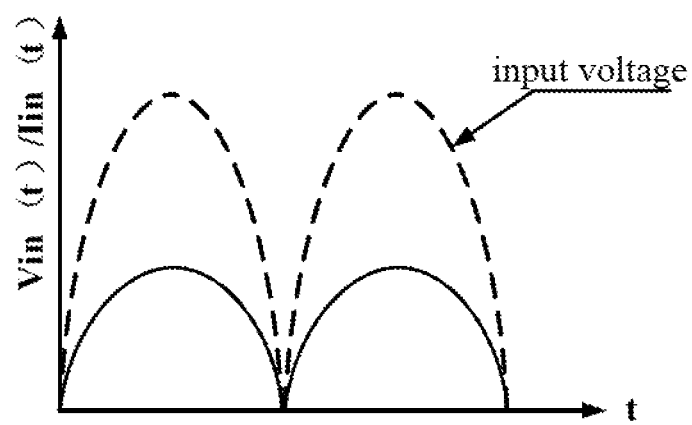
FIG. 2 is a chart showing the input voltage waveform and the input current waveform using a power factor correction.
Figure 3:
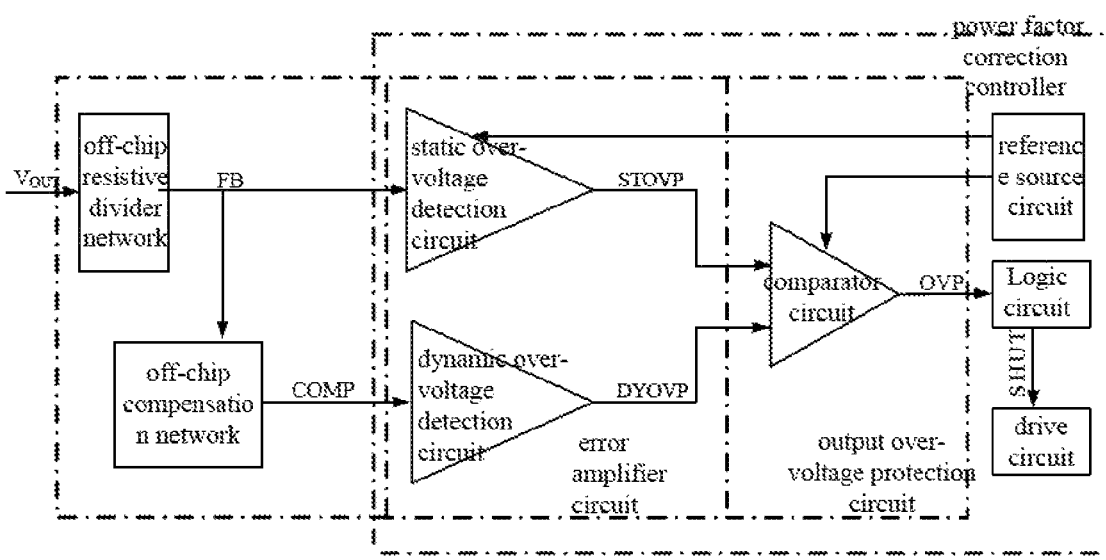
FIG. 3 illustrates a block diagram of a circuit according to the present invention.

For convenience of description, the present invention provides a block diagram of the output over-voltage protection circuit used in power factor correction controller, which is shown in FIG. 3. The output over-voltage protection circuit of the present invention includes: an off-chip resistive divider network, an off-chip compensation network, a static over-voltage detection circuit, a dynamic over-voltage detection circuit, and a comparator circuit. The off-chip compensation network is coupled between the off-chip resistive divider network and the dynamic over-voltage detection circuit. The off-chip compensation network is configured to convert a dynamic over-voltage signal to a dynamic current signal and transmit the dynamic current signal to the dynamic over-voltage detection circuit. The dynamic over-voltage detection circuit is configured to detect the dynamic current signal and generate a dynamic over-voltage signal DYOVP; the dynamic over-voltage signal DYOVP is inputted into the comparator circuit, the comparator circuit is configured to convert the dynamic over-voltage signal DYOVP to a voltage and compare the voltage with a reference voltage and then output an over-voltage control signal OVP so as to perform a dynamic over-voltage protection function. In the illustrated embodiment, the over-voltage protection circuit implements dynamic over-voltage protection or static over-voltage protection according to the short-term behavior or long-term behavior of the output voltage over-voltage, respectively. Referring to FIG. 3, the specific manner is: when the output voltage of the power factor correction controller suddenly increases to exceed the rated voltage due to load changes and other reasons, since the bandwidth of the error amplifier circuit is very narrow, its feedback input voltage $V_{FB}$ maintains in a stable reference voltage provided by a reference source circuit, the transient large current will pass through the off-chip compensation network and enter the output terminal COMP of the error amplification circuit. The COMP terminal is connected to the input terminal of the dynamic detection circuit, which is configured to detect the transient large current and output the dynamic over-voltage signal DYOVP, the comparator circuit is configured to convert the current signal to a voltage and compare the voltage with the reference voltage, and then the over-voltage control signal OVP is outputted. If the output voltage of the power factor correction controller slowly increases to exceed the rated voltage or suddenly increases to exceed the rated voltage due to load changes and other reasons, and all the output voltages do not drop to the normal value in a short period of time, the reference current generated by the reference source circuit is mirrored out to be static over-voltage detection signal STOVP when the low clamping circuit of the output terminal of the error amplifier occurs, this signal is configured to be an input terminal of the comparator circuit, and is compared with the internal reference current of the comparator circuit and the over-voltage signal OVP is outputted. In the present invention, for both the dynamic over-voltage and the static over-voltage, the over-voltage signal OVP is outputted, and it then enters the logic circuit to shutdown the power tube. Since the bandwidth of the error amplifier in the power factor correction controller is narrow, it is difficult to make the correct response when the output voltage instantaneously exceeds the rated voltage, this problem is effectively solved by the present invention using the output over-voltage protection circuit, and the transient response for the output over-voltage of the power factor correction controller is improved. Meanwhile, if the output voltage is always in a steady-state that exceeds the rated voltage, the static over-voltage detection circuit can provide an effective output; the effective output passes through the comparison circuit and the logic circuit, then shutdowns the power tube. Accordingly, for both dynamic over-voltage and static over-voltage, the present invention can make the right response and provide an effective protection for the power factor correction controller and its peripheral electronic components.

Figure 4:
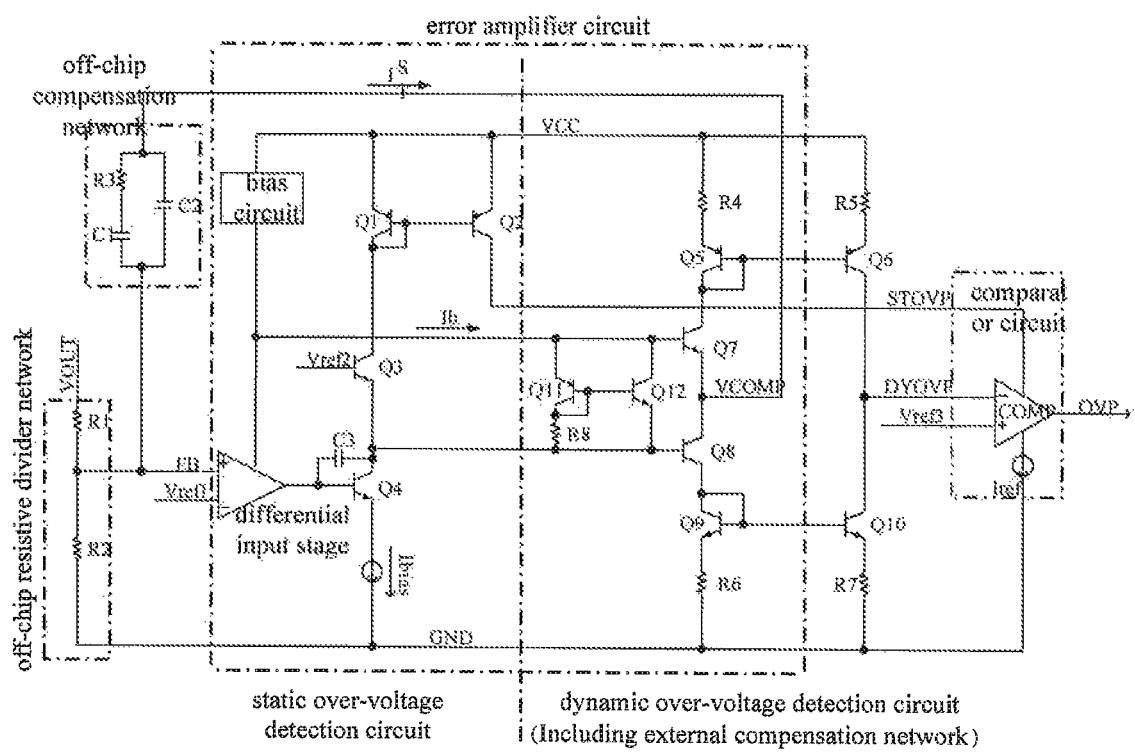
FIG. 4 illustrates a schematic circuit diagram of the present invention.

Referring to FIG. 3 and FIG. 4, the structure and working principle of each unit circuit of the present invention are as follows:

The off-chip compensation network is coupled between the output terminal $V_{OUT}$ of the power factor correction and the input terminal FB of the differential input stage of the error amplifier. When the output voltage of the power factor correction controller slowly increases to exceed the rated voltage or suddenly increases to exceed the rated voltage due to load changes and other reasons, and all the output voltage $V_{OUT}$ do not drop to the normal value in a short period of time, the voltage $V_{FB}$ of the input terminal FB of the differential input stage maintains at a high level. Since the other input terminal of the differential input stage is the reference voltage Vref1 provided by the reference source circuit, the difference signal of the $V_{FB}$ and the Vref1 is amplified, the output voltage of the differential input stage is at the high level. The output terminal of the differential input stage is connected to the input terminal of the intermediate amplifier circuit, i.e. a base of the transistor Q4. The output voltage of the differential input stage is higher than the threshold voltage of the transistor Q4, while a collector of the transistor Q4 is pulled to a low level. Since the voltage of the base of the transistor Q3 is the reference voltage Vref2 provided by the reference source circuit. When the base of the transistor Q4 is pulled down, the voltage ($V_{BE}$) of the base (B)—the emitter (E) of the transistor Q3 exceeds the turn-on voltage drop of the transistor, the transistor Q3 is turned on; in the condition that transistor Q3 and transistor Q4 are turned on at the same time, the current path VCC-Q1-Q3-Q4-Ibias-GND is generated between the voltage VCC to GND. The reference current $I_{bias}$ provided by the reference source circuit will flow through the transistor Q1. The current mirror circuit consists of the transistor Q1 and transistor Q2, thus the current $I_{bias}$ will be mirrored as static an over-voltage detection output signal STOVP; the static over-voltage detection output signal STOV enters into the comparison circuit, the comparator circuit compares the current with the internal reference current of the circuit and then produces the output over-voltage signal OVP, the signal OVP enters into the logic circuit and shutdowns the power tube after passing through the logic circuit.

Since the bandwidth of the error amplifier circuit in the power factor correction controller is very narrow, when the output voltage $V_{OUT}$ instantaneously exceeds the rated voltage value, the feedback terminal voltage $V_{FB}$ of the error amplifier is still equaled to the reference voltage Vref1, when the $V_{OUT}$ instantaneously exceeds the rated voltage, a detection cannot be performed by the static over-voltage detection circuit, i.e. a stable and reliable output over-voltage protection cannot be provided by the static over-voltage detection circuit.

In a steady state, the adjustment of the off-chip resistive divider network R1 and R2 makes the output voltage $V_{OUT}$ of the power factor correction controller be the rated voltage. If the ripple component is ignored, the current passing through the R1 is $I_{R1}$, which equals to the current $I_{R2}$ passing through the R2, taking into account that the inverting input terminal of the input stage of the error amplification circuit is the reference voltage Vref1; therefore, the feedback terminal voltage $V_{FB}$ of the error amplifier circuit is equaled to the reference voltage Vref1, so:

$$I_{R2} = \frac{Vref1}{R2} = I_{R1} = \frac{V_{OUT} - Vref1}{R1} \qquad (1)$$

If there is a great change of $\Delta V0 > 0$ in the power factor correction controller due to the load changes, the feedback terminal voltage $V_{FB}$ will maintain at Vref1 by the partial feedback of the error amplifier. Accordingly, the current passing through R2 will continue to maintain at Vref1/R2, while the current passing through R1 would become:

$$I'_{R1} = \frac{V_{OUT} - Vref1 + \Delta V_O}{R1} \qquad (2)$$

The differential current $I_{st}=\Delta I_{R1}=I'_{R1}-I_{R2}=I'_{R1}-I_{R1}=\Delta V_O/R1$ passes through the off-chip compensation network and enters into the output terminal VCMOP of the error amplifier circuit; the current $I_{st}$ will pass through the AB push-pull output stage circuit and the dynamic of the dynamic current mirror circuit, and then the current is outputted as the dynamic over-voltage signal DYOVP; the dynamic over-voltage signal DYOVP enters into the comparison circuit, the comparison circuit converts the signal to a static voltage and compares it with the reference voltage provided by the reference source circuit, and the output over-voltage signal OVP is outputted, the signal OVP enters the logic circuit and shutdowns the power tube after passing through the logic circuit.

In the present invention, for both the occurrence of dynamic over-voltage and the static over-voltage, the over-voltage signal OVP is outputted, and enters into the logic circuit to shutdown the power tube. In the present invention, the problems that there is no output over-voltage circuit or only a single static over-voltage circuit in the conventional power factor correction controller are effectively solved.

Although the present invention has been described with reference to the embodiments thereof and the best modes for carrying out the present invention, it is apparent to those skilled in the art that a variety of modifications and changes may be made without departing from the scope of the present invention, which is intended to be defined by the appended claims.

What is claimed is:

1. An output over-voltage protection circuit for power factor correction, comprising:
   an off-chip compensation network, an off-chip resistive divider network, a static over-voltage detection circuit, a dynamic over-voltage detection circuit, and a comparator circuit; wherein the off-chip compensation network is coupled between the off-chip resistive divider network and the dynamic over-voltage detection circuit, the off-chip compensation network is configured to convert a dynamic over-voltage signal to a dynamic current signal and transmit the dynamic current signal to the dynamic over-voltage detection circuit, the dynamic over-voltage detection circuit is configured to detect the dynamic current signal and generate a dynamic over-voltage signal DYOVP; the dynamic over-voltage signal DYOVP is inputted into the comparator circuit; the comparator circuit is configured to convert the dynamic over-voltage signal DYOVP to a voltage and compare the voltage with a reference voltage and output an over-voltage control signal OVP so as to perform a dynamic over-voltage protection function,
   wherein the dynamic over-voltage detection circuit comprises an AB push-pull output stage circuit and a dynamic current mirror circuit; an input terminal of the AB push-pull output stage circuit is connected to an output terminal of an intermediate amplifier circuit; the other end of the AB push-pull output stage circuit is connected to a bias circuit; the bias circuit is configured to provide a constant bias for the AB push-pull output stage circuit; an output terminal of the AB push-pull output stage circuit is connected to an input terminal of the dynamic current mirror circuit, the other output terminal is a COMP, the output terminal is connected to an output terminal of the off-chip compensation network, thus the COMP terminal is also an input terminal of the dynamic over-voltage detection circuit.

2. The output over-voltage protection circuit according to claim 1, wherein the off-chip compensation network consists of a resistor R3, a capacitor C1, and a capacitor C2; an end of the capacitor C1 is used as an end of the off-chip compensation network and is connected to an end of the capacitor C2; the other end of the capacitor C1 is connected to the resistor R3; the other end of the capacitor C2 and the other end of the resistor R3 are connected together being as the other end of the off-chip compensation network and also an input terminal of the dynamic over-voltage detection circuit, the terminal is also an output terminal COMP of an error amplifier circuit.

3. The output over-voltage protection circuit according to claim 1, wherein the off-chip resistive divider network consists of a resistor R1 and a resistor R2, an end of the resistor R1 is connected to an output voltage $V_{out}$ of a power factor correction controller, the other end of the resistor R1 and an end of the R2 are connected together and are used as an input terminal of the off-chip compensation network and the static over-voltage detection circuit; the other end of the resistor R2 is connected to a ground GND.

4. The output over-voltage protection circuit according to claim 1, wherein the static over-voltage detection circuit comprises a differential input stage circuit, an intermediate amplifier circuit, and a low clamp circuit; a non-inverting input end of the differential input stage circuit is connected to an output terminal of the off-chip resistive divider network; an inverting input end is connected to a reference voltage Vref1, the output terminal is connected to an input terminal of the intermediate amplifier circuit.

5. The output over-voltage protection circuit according to claim 4, wherein the intermediate amplifier circuit consists of a transistor Q4 and a capacitor C3; a base of the transistor Q4 and an end of the capacitor C3 are connected together and then connected to an input terminal of a differential input stage; a collector of the transistor Q4 and the other end of the capacitor C3 are connected together and then connected to an emitter of a low clamping switch Q3 being as an output terminal of the intermediate amplifier circuit; the intermediate amplifier is configured to perform a secondary amplification for an output signal of the differential input stage.

6. The output over-voltage protection circuit according to claim 4, wherein the low clamp circuit consists of a transistor Q1, a transistor Q2, a transistor Q3, and a current bias $I_{bias}$; an emitter of the transistor Q1 and an emitter of the transistor Q2 are connected to a volt current condenser VCC; a base and a collector of the transistor Q1 are connected together to be an end connected to a collector of the transistor Q3; a collector of the transistor Q2 is configured to output a static over-voltage signal STOVP to an input terminal of the comparator circuit; a base of the transistor Q3 is connected to a reference voltage Vref2; the Vref2 is a low clamping voltage of an output terminal COMP of an error amplifier; an emitter of the transistor Q3 is connected to an output terminal of an intermediate amplifier circuit; the current bias $I_{bias}$ provides a current needed to mirror output to STOVP when the low clamping circuit occurs.

7. The output over-voltage protection circuit according to claim 1, wherein the AB push-pull output stage circuit consists of a transistor Q11, a transistor Q12, a transistor Q5, a transistor Q7, a transistor Q8, a transistor Q9, a resistor R4, a resistor R6, and a resistor R8; a base and a collector of the transistor Q11 are connected together and then connected to a base of the transistor Q12 and an end of the resistor R8; the other end of resistor R8 is connected to an emitter of the transistor Q12 and also connected to an output terminal of the intermediate amplifier circuit, and an emitter of the transistor Q12 is connected to a base of the transistor Q8; an emitter of the transistor Q11 and a collector of the transistor Q12 are connected together to connect to a bias circuit, the emitter of the transistor Q11 is also connected to a base of the transistor Q7; an end of the resistor R4 is connected to the volt current condenser VCC; the other end of the resistor R4 is connected to an emitter of the transistor Q5; a base and a collector of the transistor Q5 are connected together to connect to a collector of the transistor Q5 and a base of the transistor Q6; an emitter of the transistor Q7 and an emitter of the transistor Q8 are connected together being as an output terminal VCOMP of the AB push-pull output stage circuit, and the end is also connected to the off-chip compensation network, the off-chip compensation network is configured to provide a dynamic current $I_{ST}$ to a COMP when the dynamic over-voltage occurs; a collector of the transistor Q8, a base and an emitter of the transistor Q9 are connected together; a base of the transistor Q9 and a base of the transistor Q10 are connected together; the emitter of the transistor Q9 is connected to an end of the resistor R6, the other end of the resistor R6 is connected to a ground GND.

8. The output over-voltage protection circuit according to claim 1, wherein the dynamic current mirror circuit consists of a resistor R5, a resistor R7, a transistor Q6, and a transistor Q10; an end of the resistor R5 is connected to a volt current condenser VCC, the other end of the resistor R5 is connected to an emitter of the transistor Q6; a base of the transistor Q6 and a base of the transistor Q5 are connected together to be an input terminal of a dynamic mirror circuit; an emitter of the transistor Q6 and an emitter of the transistor Q10 are connected together being as output terminal of the dynamic over-voltage signal and also being as an input terminal of the comparator circuit; a base of the transistor Q10 and a base of the transistor Q9 are connected together; an emitter of the transistor Q10 is connected to an end of the resistor R7, the other end of the resistor R7 is connected to a ground GNP.

\* \* \* \* \*